United States Patent
Hewes et al.

(10) Patent No.: US 9,009,233 B2
(45) Date of Patent: Apr. 14, 2015

(54) SYSTEM AND METHOD USING PRESENCE IN A DATA NETWORK TO FACILITATE COMMUNICATION

(75) Inventors: Gerald Hewes, Lexington, MA (US); Eswar Priyadarshan, West Roxbury, MA (US)

(73) Assignee: Mobile Messenger Global, Inc., Los Angeles, CA (US)

( * ) Notice: Subject to any disclaimer, the term of this patent is extended or adjusted under 35 U.S.C. 154(b) by 2402 days.

(21) Appl. No.: 10/556,976

(22) PCT Filed: May 17, 2004
(Under 37 CFR 1.47)

(86) PCT No.: PCT/US2004/015432
§ 371 (c)(1),
(2), (4) Date: May 7, 2009

(87) PCT Pub. No.: WO2004/104771
PCT Pub. Date: Dec. 2, 2004

(65) Prior Publication Data
US 2010/0070581 A1    Mar. 18, 2010

Related U.S. Application Data

(60) Provisional application No. 60/471,191, filed on May 16, 2003.

(51) Int. Cl.
*G06F 15/16* (2006.01)
*H04L 29/08* (2006.01)
*H04L 12/58* (2006.01)
*H04W 4/02* (2009.01)

(52) U.S. Cl.
CPC ............ *H04L 67/24* (2013.01); *H04L 12/5815* (2013.01); *H04L 51/043* (2013.01); *H04W 4/02* (2013.01); *H04L 67/26* (2013.01); *H04L 67/18* (2013.01)

(58) Field of Classification Search
USPC .......................................................... 709/206
See application file for complete search history.

(56) References Cited

U.S. PATENT DOCUMENTS

| | | | |
|---|---|---|---|
| 7,305,350 B1 * | 12/2007 | Bruecken ...................... | 705/346 |
| 2002/0184089 A1 * | 12/2002 | Tsou et al. ...................... | 705/14 |
| 2004/0039775 A1 * | 2/2004 | Yoshida et al. ............... | 709/203 |
| 2011/0167123 A1 * | 7/2011 | Coskun et al. ................ | 709/206 |

OTHER PUBLICATIONS

J. Rosenberg et al, SIP Extensions for Instant Messaging, Apr. 12, 2001, IETF.*

* cited by examiner

*Primary Examiner* — Ryan Jakovac
(74) *Attorney, Agent, or Firm* — Arent Fox LLP (57) ABSTRACT

A method and system utilizing presence in a presence aware data/messaging network between a user and an organization for communication purposes to indicate when both parties are ready to engage in a dialog session or when one party has new information for the other party. The method and system can be further enhanced if the presence aware network also provides location information or other state information on the user.

7 Claims, 6 Drawing Sheets

SYSTEM AND METHOD USING PRESENCE IN A DATA NETWORK TO FACILITATE COMMUNICATION

CROSS-REFERENCE TO RELATED APPLICATIONS

This application claims the benefit of priority to U.S. application Ser. No. 60/471,191, filed May 16, 2003, the entire disclosure of which is hereby incorporated by reference as if set forth at length herein.

STATEMENT REGARDING FEDERALLY SPONSORED RESEARCH OR DEVELOPMENT

Not applicable

REFERENCE OF A "MICROFICHE APPENDIX"

Not applicable

FIELD OF THE INVENTION

The present invention relates to facilitating communication between an organization and users and more particularly to a system, method, machine and product for executing message oriented dialogs via a presence aware data network.

BACKGROUND OF THE INVENTION

In our competitive age, organizations have a great need to communicate with their customers or potential customers, whether it be for marketing and brand awareness purposes, sales support or customer service.

A significant improvement in the communications area is the emergence of real-time messaging communication systems with presence information, such as the popular instant messaging ("IM") services: AOL® Instant Messenger™ ("AIM"), Yahoo® Messenger, MSN® Messenger. These real-time messaging channels provide organizations the unmatched ability to reach the individual (not just the household), in a time- and event-sensitive way, when both parties want to be reached.

Presence is defined as the willingness and ability of a user to communicate with others on a network. A presence aware data network is a data network with the protocol support in the network to detect when a user is able and willing to communicate with others at that point in time. This "presence" information is then communicated through the data network to other pasties that have indicated that they wish to know when the user is "present". This is most often implemented by a system of buddy lists. As a user of a presence aware data network, you enter the handle identifying the users you wish to communicate with on a regular basis and be informed of their presence status in a buddy list. The handle, also called screen name, is used to uniquely identify users and application on the presence aware data network. The communication client used by the user will then display the online/offline status of users in his buddy list. In most presence aware network more than just online/offline information is reported. For example some networks give you different feedback if the user is online using a direct land based link or through a mobile wireless link. Most networks also are able to report on the device activity or inactivity. A user may be logged into the network but not actually in front of the communication client used to connect to the network. Some clients also allow users to set different presence state-like "I'm away from my desk for a few minutes". Hence a presence aware network communicates between parties each party ability and willingness to communicate.

Presence aware data/messaging networks are very attractive to users because users are only interrupted by others when they are willing to receive a communication. The presence information is reporting to others your willingness to communicate. If a user does not want to communicate he can either log off the network or set a state that indicates this unwillingness to be disturbed. Hence such systems are less intrusive for both parties than, for example, a telephone call. As the receiver of the telephone call you can get interrupted at any time. As a caller you don't know if the called person is willing to receive the call at this point in time, or if you will interrupt the called person, or instead be dropped into a voice-mail system. Alternatives to real-time communication systems, like instant messaging or the telephone network, are message based systems, like e-mail. But these are less natural for quick two-way communication even if they do allow the recipient to control the timing of the communication.

The types of communications organizations want to perform are varied. Organizations may want to promote offer and sale opportunities. They may want to offer items in short supply to their loyal customers (for example hot concert ticket sales.) They may simply want to build brand awareness of their products and services. They may want to provide information on their products and services. They may want to deliver timely information to the their customers. In our modern economy many of these communications are time critical. Tickets get sold quickly; promotions have precise start and end dates. Presence aware data networks are an ideal channel to bring together organizations and users when both want to communicate and where time is a key component.

Organizations may also want to engage into a dialog with users based on the user location. Being able to achieve this can provide many benefits to an organization. But this has to be done in a user acceptable manner. There is a fine line between wanting to let a user know you want to attract his attention and having the user feel harassed or stalked. Leveraging presence and location aware networks is one way to achieve such balance. Instead of pushing offers to a user when she is in proximity of a store, the store could simply register its presence on her mobile device, and she can decide weather and with whom to interact.

Users increasingly receive solicitation for their attention from organizations through the various direct marketing channels, but many now feel overwhelmed, and in particular resent un-solicited messages from organizations through computer based channels such as e-mail. Users want to regain control and decide with whom and when they engage in a dialog with an organization. Hence, it is important that organizations wanting to interact with their users be perceived as un-obtrusive.

Users can be very receptive to using such real-time messaging systems to dialog with an organization. Real-time messaging can be used for pull programs where the user initiates a dialog on his own or for push programs where the organization initiates a dialog with a pre-registered user. Presence offers a hybrid mode where the organization signals it is ready and wants to engage in a dialog using the messaging system presence functionality. When a user sees the organization is ready to engage in a dialog through its presence indicator, she can decide if she wants to engage in a dialog, and when. Similarly, if the user opted-in to receive notifications from the organization, the organization can use the user presence information to engage in a dialog when the user is available.

Recently, some IM systems have offered some organizations the ability to use their network for communication purposes or have been used to connect users to automated systems. These are called "Bots" and allow IM users to interact with organization's computerized systems. But to date, all these operate in a passive mode where the bot is always on-line, and the user simply interacts when ready. They do not use presence to indicate to individual users, when they have new information for them, or to contact them if need be pro-actively.

Thus, an object of the present invention is to enable users and organizations in a variety of settings/for a variety of applications to engage in dialog when both are ready to do so by leveraging the presence mechanism present in presence aware networks. Numerous applications of the invention exist and include, for example, customer support applications, which enables an organization to notify a customer that it has a billing issue with him, or a car dealership that a customer car is ready for pickup.

Another application/use of the invention is to help IM service providers monetize non-paying users of their system. Most public IM systems are freely available to users. It is natural for such IM service operators to look for ways to generate revenue from these non-paying users. Some IM service operators have responded by reserving some real-estate on their IM clients for brand sponsoring. This is effective—but can be defeated if users use third party clients to connect to the IM network, and simple banner ads may not be very effective. With this invention, the IM operator could add service handles directly to the users buddy list without the user initiating this. Part of a user buddy list would be brands that paid the IM service operator to be placed in non-paying users buddy list. This is similar to free web sites that charge advertisers for banner adds displayed on the web site. If an IM service operator took such an approach, it is clear there would be more advertisers interested that could reasonable fit in a users buddy list. Hence this invention also includes the ability for the IM operator to subset the list of brands that appears on the buddy list, or subset the list of brands that the user sees as available using a system to perform this. The functionality of that system would be similar to what is used today in advertisement servers that place an ad among many available ads on a web page, and that choice is based on a multitude of factor such as what advertisers paid to be placed and prior user behavior; for example placing service handle of advertisers selling computer equipment if it is known the user had responded to prior computer equipment offers. Where presence fits it this application of IM technology is organizations could use the network presence to indicate to the IM service operator that they have something to offer, which would make the organization eligible for being presented to users.

SUMMARY DESCRIPTION OF THE INVENTION

The present invention is a method and system utilizing presence in a presence aware network to enhance the communication between users and organizations. It describes new methods leveraging presence in a presence aware network to enable users and organization to communicate or receive information at the right time.

DETAILED DESCRIPTION OF THE INVENTION

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Figure 1:
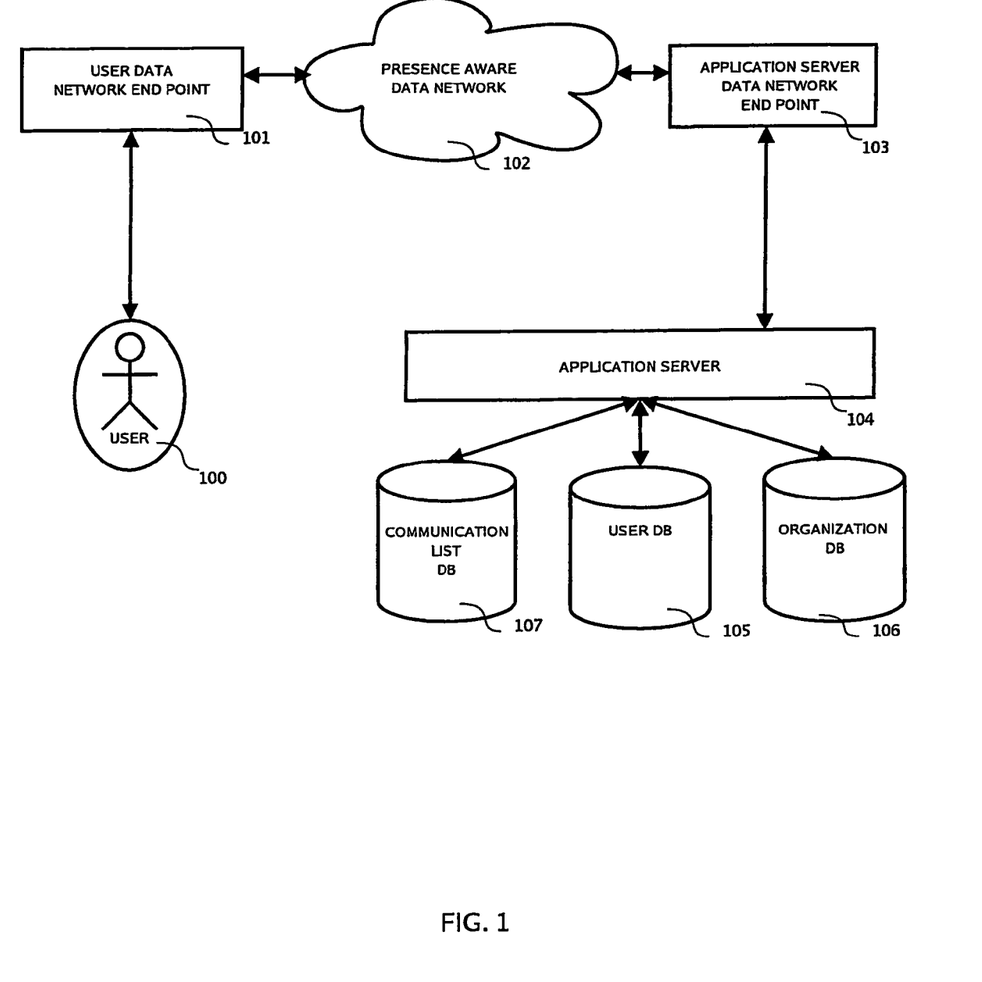
FIG. 1 depicts an exemplary embodiment of system components of the invention

FIG. 1

FIG. 1 depicts an exemplary embodiment of a network system 1 constructed in accordance with the present invention comprises the following interconnected components: a user data network end point (101), a presence aware data network (102), an application server data network end point (103), and an application server (104).

User Data Network End Point (101)

The user data network end point (101) comprises a processor that is configured to act as an interface to the presence aware data network (102). Examples of a user data network end point (101) include, for example, a stationary computing device such as a desktop computer, etc., and a portable/mobile computing device such as a laptop computer, mobile telephone, personal digital assistant, etc. The user data network end point (101) interfaces with the presence aware data network (102) via a communications network such as the Internet.

Presence Aware Data Network (102)

The presence aware data network (102) comprises a communications network implementing a presence protocol, including but not limited to proprietary systems used by IM service providers, standard protocols such as Session Initiation Protocol ("SIP") and SIP for Instant Messaging and Leveraging Extensions ("SIMPLE"), Extensible Messaging and Presence Protocol ("XMPP"), or any substantially similar protocols.

Application Server Data Network End Point (103)

The application server data network end point (103) is a client protocol built above a standard networking protocol, including but not limited to the Internet, programmed to present a computer usable interface to said presence aware data network (102). In one exemplary embodiment, the application server data network end point (103) is implemented as a shared library or dynamically loaded library ("DLL") for common operating systems.

Application Server (104)

The application server (104) comprises a processor that is configured to execute dialogs following a set of instructions. In one exemplary embodiment, the application server (104) is associated with a user database (105) that stores information related to the user. In one exemplary embodiment, the application server is associated with an organization database (106) that stores information related to the organization. In one exemplary embodiment, the application server (104) is associated with a communication list (107) that stores a list of user interested in a particular communication program.

Figure 2:
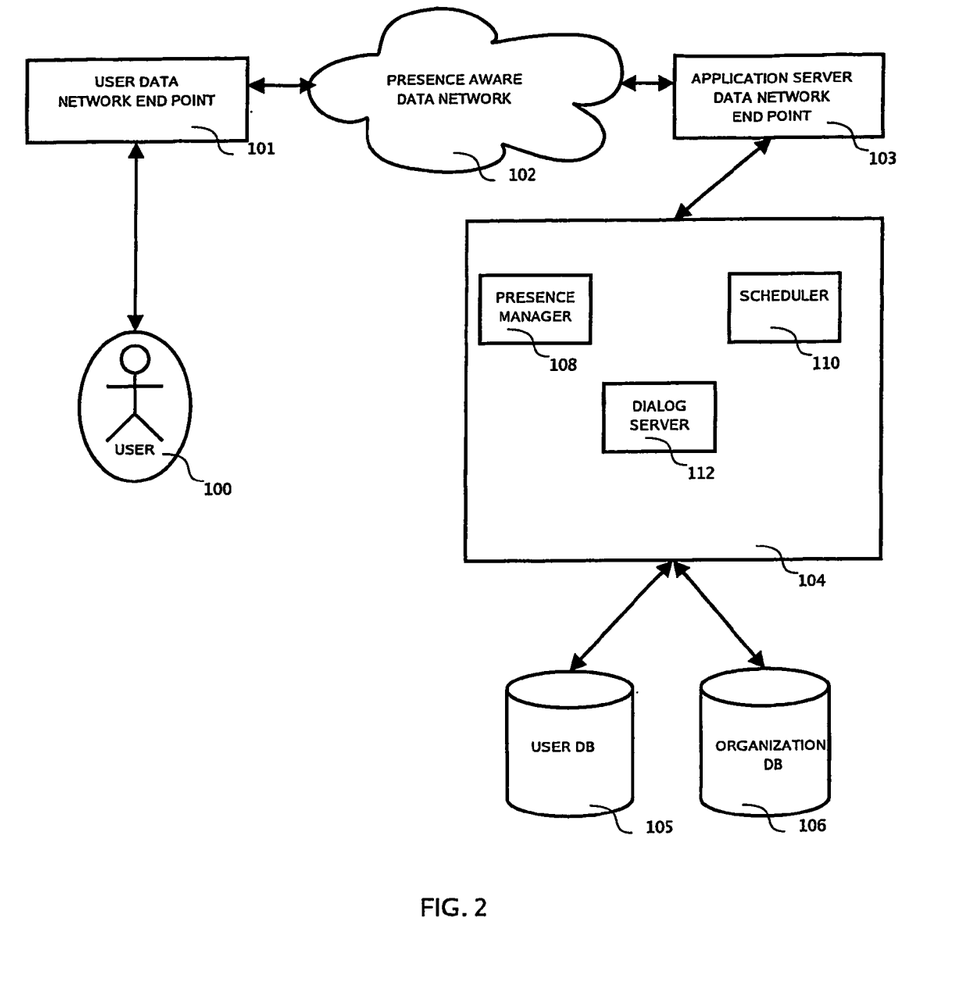
FIG. 2 depicts an exemplary embodiment with additional components for user management

FIG. 2

FIG. 2 depicts in an alternative embodiment, system 1 further comprises a presence manager (108) a scheduler (110) and a dialog server (112).

Presence Manager 108

The presence manager is configured to detect and manage the presence of a user on the network, i.e., whether the user's device (100) is online, offline, or in a particular state. Once the user's online state or other state is detected, the presence manager (108) is further programmed to trigger a dialog server (112) to initiate a communication ("Push mode"), or a scheduler (110) to initiate a computer program/application/bot to appear online, or to appear offline, in for example, the user's buddy list ("Active Pull mode"). The dialog server (112) is programmed to execute a dialog or communication between the user (100) and the organization.

During detection, the presence aware data network (102) may notify the presence manager 108 of a given user's presence on the network. Alternatively, the presence manager (108) may query the presence aware data network (102) at predetermined intervals for the state of all users on the network.

The presence manager (108) is also configured to track one or more of the following: 1) the user's on/offline state, 2) the user's mobile/land-line state, 3) the user's location, 4) the user's idle time, where idle time indicates how long ago the user last interacted with the user data network end point (101), 5) the user's unavailable state—"I'm away from my desk" state, and 6) any other state or information available about the user by the presence aware network (102).

Dialog Server 112

The dialog server (112) comprises one or more applications/programs/bots.

Scheduler 110

The scheduler (110) interacts with and controls the dialog server (112) and initiates the signing in and out of the dialog server bots. Applications for the scheduler (110) can include signing-in at regular times to deliver time-based information—for example stock quotes at the end of the trading day, or weather forecast in the morning; signing-in based on external events, like sports results when a sport team marks a major score.

In an exemplary embodiment of the present invention, the application server (104), presence manager (108), scheduler (110) and dialog server (112) can service a plurality of programs/applications/bots and a plurality of organizations.

Figure 3:
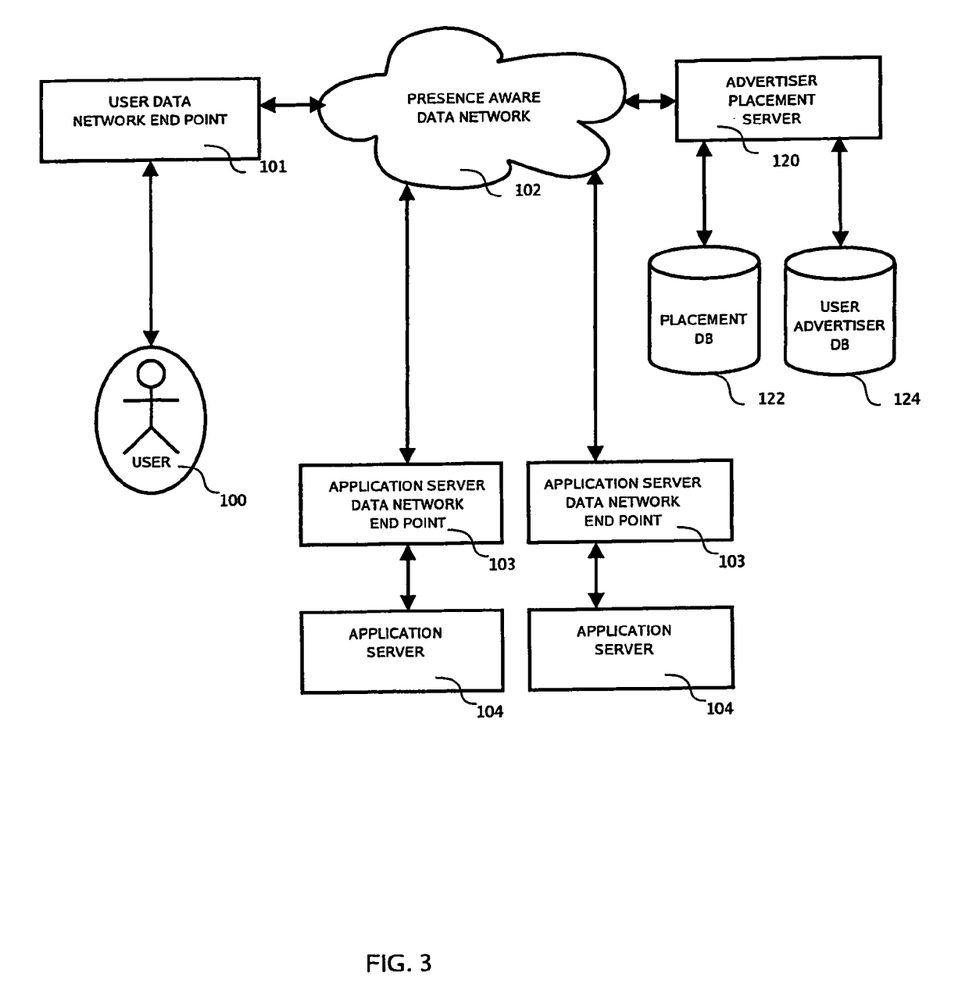
FIG. 3 depicts an exemplary embodiment depicting advertiser placement.

FIG. 3

FIG. 3 depicts an alternate embodiment of system 1 further comprising an advertiser placement server (120) to detect and monitor the online presence status of a plurality of organization's application servers (104) and to select from among the online application servers (104) to present to users (100). The advertiser placement server (120) is connected to a placement database (122) which contains information on all participating organizations, message application servers (104), their service handle and any other configuration data or data required for the advertiser placement server (120) to execute its programmed placement rules. The advertiser placement server (120) is also connected to a user advertiser database (124) which contains profiling information on the user (100) required for the advertiser placement servers (120) to execute its programmed placement rules.

The advertiser placement server (120) is configured to modify the advertisement section of users (100) buddy list directly.

The advertiser placement servers (120) is also configured to proxy the traffic from the advertiser's application server (104) via a fixed set of service handles. As such, the advertiser placement server (120) would not need to be part of the presence aware data network (102), but could be, for example, a bot connected to the presence aware data network (102) via a standard application server data network end point (103). A message from a user (100) would travel from the user data network end point (101) to the advertiser placement server (120), which in turn would relay the message back to the appropriate advertiser application server (104). Similarly, a message from the advertiser application server (104) would travel to the advertiser placement server (120), which would relay it back to the user data network end point (101). Such routing information between the user (100) and the advertiser message application server (104) would be stored in the user advertiser database (124).

Figure 4:
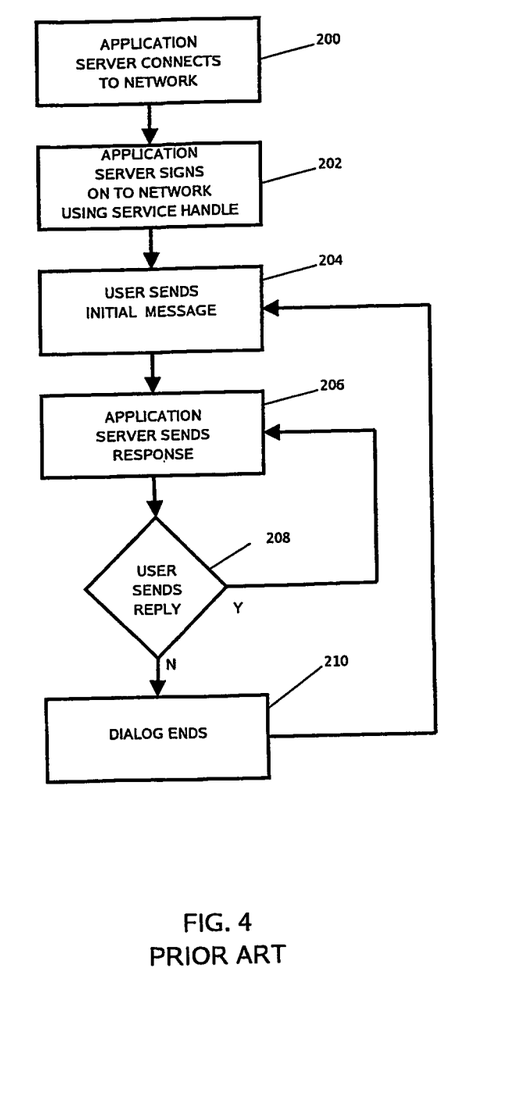
FIG. 4 depicts the always-on pull mode embodiment flow chart (Prior Art)

FIG. 4

FIG. 4 depicts an exemplary process flow of a typical prior art IM application/program/bot. At 202, the organization application server (104) permanently signs in to the network using its service handle. At 204, the user (100) interacts with the organization application server (104) by entering the organization's service handle in the user data network end point (101) and by sending an initial message to the organization application server (104). At 206, the organization application server (104) responds to the user's initial message, initiating a dialog session between the user and the organization. At 208, the user (100) engages in further dialog with the organization application server (104) until, at 210, the dialog session terminates. This process flow does not leverage presence because the organization application server (104) is always registered in the network.

Figure 5:
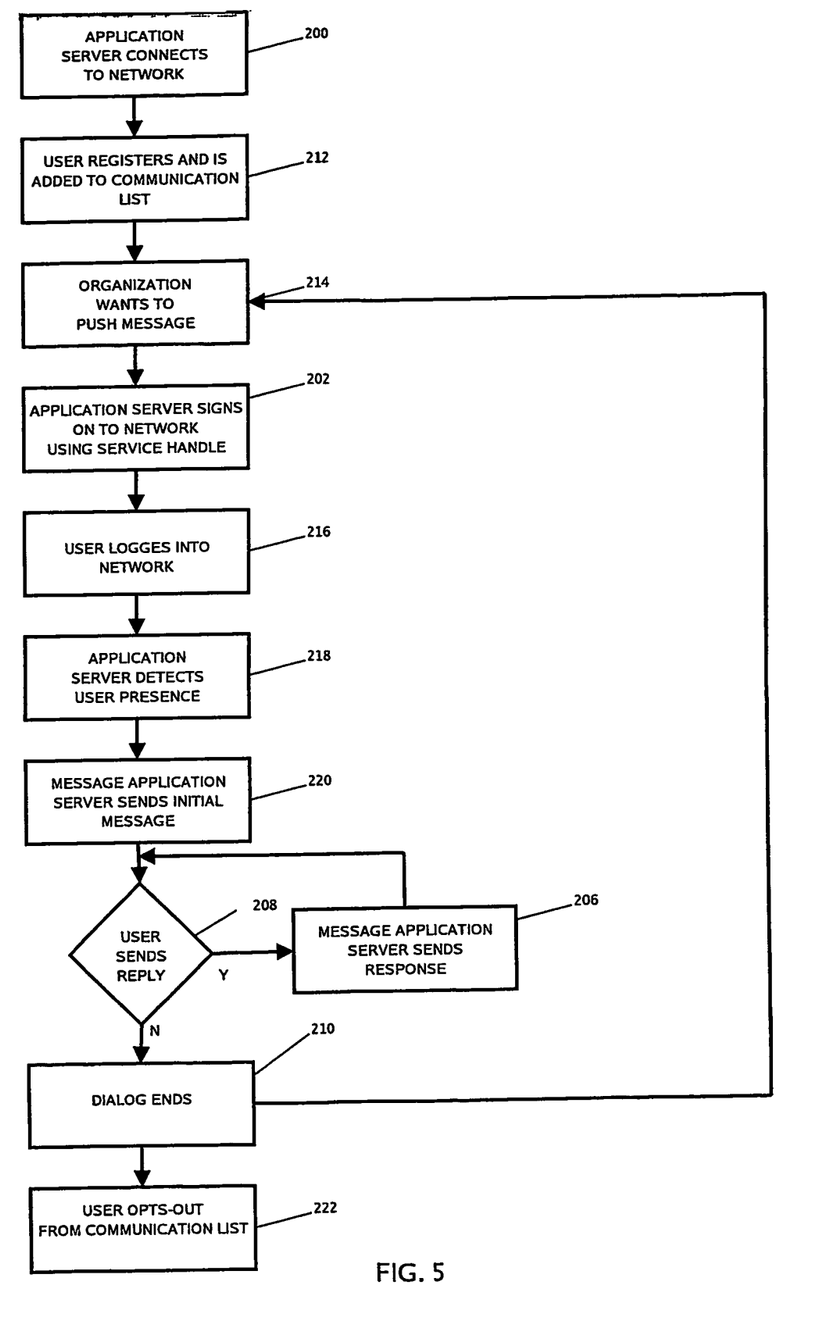
FIG. 5 depicts the push mode embodiment flow chart.

FIG. 5

FIG. 5 is an exemplary flow depicting the "Push mode" process of the present invention, which leverages the presence information of users in the presence aware data network (102). At 200, an organization's application server connects to the presence aware data network (102). At 212, users register with the organization generating user handles. The organization collects and stores the users handles in an appropriate list in the communication list database (107). Registration can be implemented, but is not limited to, using a web site registration page or a client application running on a computing device connected by means of a data network to the organization. At 214, the organization elects to communicate with the registered users. At 202, the application server (104) signs into the presence aware data network (102). At 216, the registered user (100) logs into the presence aware data network (102). The registered user (100) is already logged into the presence aware data network (102), At 218, the application server (104) detects the registered user status. At 220, the application server (104) sends an initial message to the registered user (100) initiating a dialog session between the organization and the registered user. At 208, the registered user responds to the application server (104) initial message, initiating a dialog session between the user and the organization. At 208, the registered user engages in further dialog with the organization application server (104) until, at 210, the dialog session terminates. At 222, the registered user (100) can opt-out from the communication list stored in the communication list database (107).

Instead of signing-in only when the organization application server (104) needs to push a message, the organization application server (104) can always be signed into the presence aware data network (102).

The detection of the user status of the user (100) in the presence aware data network (102), as described in step 218, may be implemented by means of a presence manager (108). The trigger to initiate the communication with the user (100) may be other state information beyond the online/offline state.

Figure 6:
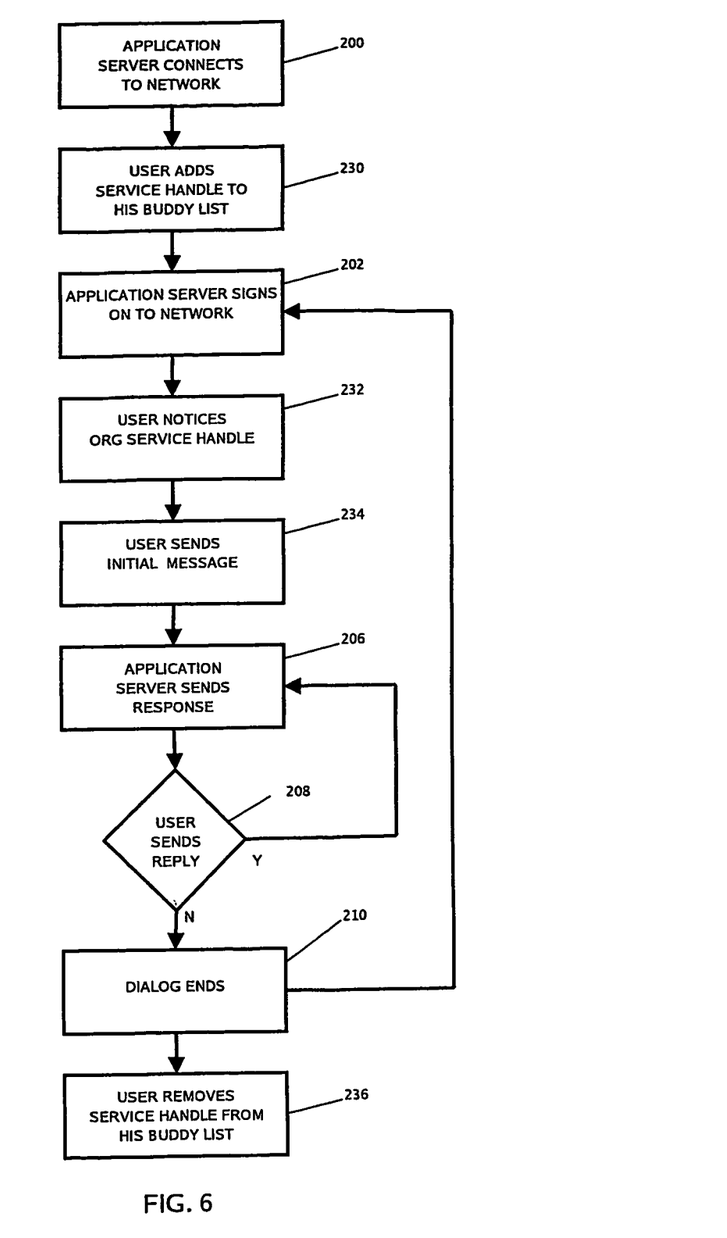
FIG. 6 depicts the active pull mode embodiment flow chart.

FIG. 6

FIG. 6, is an exemplary flow illustrating the "Active pull mode" process of the present invention, which leverages the presence information of users in the presence aware data network (102).

In "Active pull mode," the organization's application server (104) is not always signed into the presence aware data network (102). Therefore, the organization instructs users that want to participate to add the organization service handle to the users buddy list. At 200, users add the organization service handle to their buddy list. At 230, when the organization wants to communicate with users it instructs the application server (104) to sign in to the presence aware data network (102). At 232, users that are also signed in will see the organization service handle in their user data network end points (101) and know the organization has a message for them. At 234, the user (100) can send a first message to the application server (104), initiating a dialog session with the user and the organization (206, 208 and 210). At 236, the user (100) can opt-out of further communications with the organization at any time by removing the organization's service handle from the user's buddy list.

The application server (104) may connect to the presence aware data network (102) (step 200), just prior to signing in (step 232). The organization decision to sign the application server (104) in the presence aware data network (102) may be made based on the state of the user (100). This implies that each user (100) has a unique organization service handle associated with them. By having the user (100) create the unique organization service handle and having the user (100) register his/her personal handle, the unique organization service handle and the password of the unique organization service handle with the organization. Registration of the user personal handle, the unique organization service handle and the password of the unique organization service handle may be done via a web site or a client application running on a computing device.

CONCLUSION

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software running on appropriate hardware, such as, for example, the Dell™ PowerEdge 1750 Intel Xeon systems, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language such as Java, to communicate with a computer system, however, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of establishing a dialog session between an organization message application server and a user data network end point, both simultaneously present on a presence aware network, comprising:
    assigning a service presence handle to the organization message application server;
    detecting a state of a user on the presence aware network;
    storing a user presence handle associated with the state of the user of the user data network end point;
    instructing the user data network end point to store the service presence handle;
    connecting said organization message application server to the presence aware network based on the state of the user indicated by the user presence handle, said connection alerting the user data network end point that the organization has a message for the user;
    in response to said alert, receiving, from the user data network end point a first message; and
    sending a second message to said user data network end point thereby establishing a dialog session between said user data network end point and said organization message application server.

2. The method as in claim 1, wherein said organization message application server is associated with a plurality of applications and said step of sending said second message includes selecting an appropriate application from said plurality of applications to establish said dialog session.

3. The method as in claim 2, wherein said organization message application server tracks and stores user and organization data and said application selection step includes selecting one of said plurality of applications based on said user and organization data.

4. The method as in claim 1, wherein the presence aware network is an instant messaging network utilizing a presence communications protocol.

5. The method as in claim 4, wherein the presence communications protocol is Session Initiation Protocol ("SIP") and SIP for Instant Messaging and Leveraging Extensions ("SIMPLE") or Extensible Messaging and Presence Protocol ("XMPP").

6. The method as in claim 1, wherein the establishment of a dialog session between the user and the organization is subject to user opt-in or opt-out, wherein the dialog session is not established if a user opt-out has been occurred.

7. The method of claim 1, wherein the user opt-out indication comprises an indication that the user data network end point has removed the service presence handle.

* * * * *